United States Patent
Raaf

(10) Patent No.: US 6,856,805 B1
(45) Date of Patent: Feb. 15, 2005

(54) APPARATUS AND METHOD FOR OPTIMIZING ADJACENT-CHANNEL MEASURING REPORTS

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,221

(22) PCT Filed: Aug. 26, 1998

(86) PCT No.: PCT/DE98/02509

§ 371 (c)(1),
(2), (4) Date: Mar. 24, 2000

(87) PCT Pub. No.: WO99/17577

PCT Pub. Date: Apr. 8, 1999

(30) Foreign Application Priority Data

Sep. 26, 1997 (DE) ......................... 197 42 650

(51) Int. Cl.$^7$ ............................... H04Q 7/20
(52) U.S. Cl. .................. 455/436; 455/437; 370/331
(58) Field of Search ................ 455/436, 437, 455/525, 438, 439, 442, 444, 432.1, 432.2, 432.3, 422.1; 370/331, 332, 67.11, 333, 334

(56) References Cited

U.S. PATENT DOCUMENTS

| 5,787,346 A | * 7/1998 | Iseyama ..................... 455/439 |
| 5,978,679 A | * 11/1999 | Agre .......................... 455/442 |
| 5,987,099 A | * 11/1999 | O'Neill et al. ................ 379/60 |

FOREIGN PATENT DOCUMENTS

| DE | 43 03 999 A1 | 8/1994 |
| DE | 43 07 702 A1 | 9/1994 |
| EP | 0 454 638 A1 | 10/1991 |
| WO | WO 95/04419 | 2/1995 |

* cited by examiner

*Primary Examiner*—Nick Corsaro
*Assistant Examiner*—Tanmay Lele
(74) *Attorney, Agent, or Firm*—Bell Boyd & Lloyd LLC

(57) ABSTRACT

The present invention relates to a method and a system for transmitting data packets between a mobile station and a current base station of a mobile radio system. The mobile station repeatedly transmits measurement reports each containing measurement data relating to a number of adjacent base stations to the current base station. A later measurement report contains reference data for at least one adjacent base station whose measurement data have already been received from the current base station in an earlier measurement report and stored, the reference information referring to the measurement data of the respective earlier measurement report. As a result, measurement data relating to a relatively large number of adjacent base stations can be transmitted in the measurement reports or the transmission bandwidth can be reduced.

10 Claims, 3 Drawing Sheets

| MS stored | N(S) | Transmitted report | BS stored | Comments |
|---|---|---|---|---|
| 1 | 0 |  | 1 | 0 | Transmission error |
| - | 1 | 0 | R=1 N(S)=0---X\| | - | - |
| - | 1 | 0 | <--------- Ack=0 | - | - | Transmission correct |
| - | 2 | 0 | R=2 N(S)=0-----> | - | 2 |
| - | 2 | 0 | \|X---- Ack=1 | - | 2 | Ack lost |
| - | 3 | 0 | R=3 N(S)=0-----> | - | 3 | now R=3 protected |
| - | 3 | 1 | <--------- Ack=1 | - | 3 |
| 4 | 3 | 1 | R=4 N(S)=1---X\| | - | 3 |
| 4 | 3 | 1 | <--------- Ack=0 | - | 3 |
| 5 | 3 | 1 | R=5 N(S)=1-----> | 5 | 3 | R=3 as reference now R=5 protected |
| 5 | 3 | 0 | <--------- Ack=1 | 5 | 3 |
| 5 | 6 | 0 | R=6 N(S)=0-----> | 5 | 6 | R=5 as reference |

| MS stored | N(S) | Transmitted report | BS stored | | Comments |
|---|---|---|---|---|---|
| 1 | 0 |  | 1 | 0 | Transmission error |
| - | 1 | 0 | R=1 N(S)= 0---X| | - | - | |
| - | 1 | 0 | <--------- Ack=0 | - | - | Transmission correct |
| - | 2 | 0 | R=2 N(S)= 0-----> | - | 2 | |
| - | 2 | 0 | |X---- Ack=1 | - | 2 | Ack lost |
| - | 3 | 0 | R=3 N(S)= 0-----> | - | 3 | R=3 now protected |
| - | 3 | 1 | <--------- Ack=1 | - | 3 | |
| 4 | 3 | 1 | R=4 N(S)= 1---X| | - | 3 | |
| 4 | 3 | 1 | <--------- Ack=0 | - | 3 | |
| 5 | 3 | 1 | R=5 N(S)= 1-----> | 5 | 3 | R=3 as reference |
| 5 | 3 | 0 | <--------- Ack=1 | 5 | 3 | R=5 now protected |
| 5 | 6 | 0 | R=6 N(S)= 0-----> | 5 | 6 | R=5 as reference |

FIG 4

| Number of old NBs | Bits for bitmap | Bits for measurements of repeated channels | Maximum number of new NBs | Bits for number of new NBs, always set to 3 for sake of simplicity | Code and field strength new NB | Total | Additionally codable adjacent measurements | Saving in bits if only 6 adjacent channels reported |
|---|---|---|---|---|---|---|---|---|
| 0 = Prior Art | 0 | 0 | 6 | 3 | 102 | 105 | | |
| 1 | 13 | 6 | 4 | 3 | 68 | 90 | 0 | 5 |
| 2 | 13 | 12 | 4 | 3 | 68 | 96 | 0 | 16 |
| 3 | 13 | 18 | 4 | 3 | 68 | 102 | 1 | 27 |
| 4 | 13 | 24 | 3 | 3 | 51 | 91 | 1 | 38 |
| 5 | 13 | 30 | 3 | 3 | 51 | 97 | 2 | 49 |
| 6 | 13 | 36 | 3 | 3 | 51 | 103 | 3 | 60 |
| 7 | 13 | 42 | 2 | 3 | 34 | 92 | 3 | |
| 8 | 13 | 48 | 2 | 3 | 34 | 98 | 4 | |
| 9 | 13 | 54 | 2 | 3 | 34 | 104 | 5 | |
| 10 | 13 | 60 | 1 | 3 | 17 | 93 | 5 | |
| 11 | 13 | 66 | 1 | 3 | 17 | 99 | 6 | |
| 12 | 13 | 72 | 1 | 3 | 17 | 105 | 7 | |

APPARATUS AND METHOD FOR OPTIMIZING ADJACENT-CHANNEL MEASURING REPORTS

BACKGROUND OF THE INVENTION

The present invention relates to a method and system for transmitting data packets between a mobile station and a current base station of a mobile radio system, preamble of claim 1 and/or the preamble of claim 5.

In mobile radio networks with so-called mobile assisted handover algorithms, i.e. with algorithms which relate to a transfer, supported by the mobile station, of the mobile station from one mobile radio cell to the next mobile radio cell, mobile stations must regularly send information on measurements of adjacent channels or of signals of adjacent base stations to the current base station. This information is transmitted in so-called measurement reports. In the GSM system, such measurement reports are encoded in each case with 13×8+1=6×(11+6)+3=105 bits. In this way, measurement data for up to six adjacent base stations can be transmitted. 6×11 bits are used for the frequency and code transmission (BSIC, Base Station Identity Code), 6×6 bits for the actual measurement data and 3 bits for encoding the number of adjacent base stations. The mobile station transmits only measurement data relating to the six adjacent base stations which are transmitting most strongly. In the GSM system, such measurement reports are transmitted every 104 time frames without layer-2-protocol (HDLC) from one mobile station to the respective current base station. In particular in the case of completely extended networks, here in particular in the case of so-called hierarchical networks, it is, however, not necessarily the adjacent base station which is received most strongly which ensures optimum utilization of the network capacity.

The object of the present invention is thus to make available a method and a system for transmitting data packets between a mobile station and a current base station of a mobile radio system according to the preamble of claim 1 or according to the preamble of claim 5, in which the mobile station can transmit to the current base station measurement reports containing measurement data which relate in each case to the highest possible number of adjacent base stations.

This object is achieved by means of a method for transmitting data packets between a mobile station an a current base station of a mobile radio system according to claim 1, in which method the mobile station repeatedly transmits to the current base station measurement reports each containing measurement data relating to a number of adjacent base stations, and which method is characterized in that a later measurement report contains reference information for at least one adjacent base station whose measurement data have already been received by the current base station in an earlier measurement report and stored, said reference information referring to the measurement data of the respective earlier measurement report.

Furthermore, this object is achieved by means of a system for transmitting data packets between a mobile station and a current base station of a mobile radio system according to claim 5, in which system a transmitter device which repeatedly transmits to a receiver device of the current base station measurement reports each containing measurement data relating to a number of adjacent base stations is provided in the mobile station, and which is characterized in that a later measurement report contains reference information for at least one adjacent base station whose measurement data have already been received by the receiver device of the current base station in an earlier measurement report and stored in a storage device of the current base station, said reference information referring to the measurement data of the respective earlier measurement report.

The present invention thus ensures that in particular in the case of fully extended networks, and here in particular in the case of so-called hierarchical networks in which large, small and very small cells overlap in the same region, the measurement reports each contain measurement data relating to the largest possible number of adjacent base stations, because in this case the adjacent base station which is received most strongly does not necessarily ensure optimum utilization of network capacity. On the other hand, the present invention makes it possible to encode the measurement reports with the smallest possible number of bits so that the minimum amount of bandwidth is required for it. According to the present invention, the mobile station does not transmit once more to the current base station measurement data which are already known and which relate to adjacent base stations, but rather simply makes references by means of reference data. As a result, the measurement report can be encoded more efficiently as soon as an adjacent base station appears in a measurement report a second time. The transmission capacity which is saved in this way can be used, for example, for transmitting measurement data relating to further adjacent base stations.

Advantageous refinements of the present invention are specified in the respective subclaims.

In this context, earlier measurement reports are advantageously stored in the mobile station and the current base station in such a way that the same earlier measurement report or reports to which reference is made in a later measurement report is or are respectively stored in both said mobile station and current base station.

Furthermore, the current base station advantageously transmits to the mobile station, after a measurement report has been transmitted by the latter, a first acknowledgment information item acknowledging whether it has received the measurement report. Furthermore, with each measurement report the mobile station advantageously transmits to the current base station a second acknowledgment information item acknowledging whether it has received the preceding first acknowledgment information item.

According to the present invention, a protocol which is similar to the layer-2-protocol is defined between the mobile station and current base station, the mobile station knowing by means of said protocol if the current base station has received a measurement report. Furthermore, the mobile station changes the format of the measurement report and no longer repeatedly transmits the channel number reference and the code of an adjacent base station but rather only a reference information item which refers to the position in the measurement report transmitted earlier. In this way, the base station can be referenced with significantly less transmission space. In the transmission space which becomes free, the mobile station can encode and transmit measurement data of other adjacent base stations.

The present invention is explained in more detail below by means of a preferred exemplary embodiment with reference to the appended FIGS. 1 to 4, in which:

FIG. 4 shows a table with examples for the encoding of measurement reports in accordance with the present invention.

Figure 1:
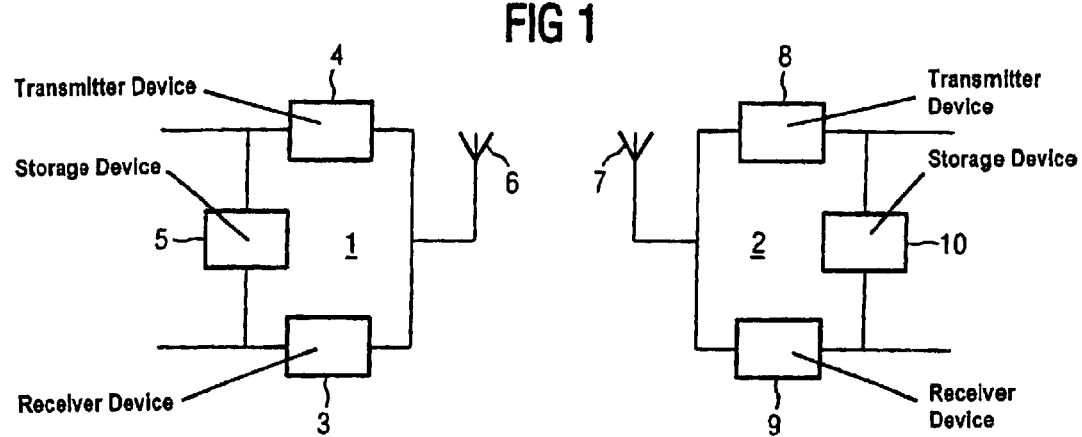
FIG. 1 shows the general design of a system for transmitting data packets between a mobile station and a current base station.

FIG. 1 shows the general design of a system for transmitting data packets between a mobile station and a current base station of a mobile radio system with a current base station 1 and a mobile station 2. The base station 1 comprises a receiver device 3 and a transmitter device 4 with a common antenna 6. The transmitter device 4 and the receiver device 3 are connected to a storage device 5 in which respective measurement reports which have been received by the mobile station 2 at an earlier time can be stored. The mobile station 2 comprises an antenna 7 which is connected to a transmitter device 8 and a receiver device 9. The transmitter device 8 and the receiver device 9 of the mobile station 2 are connected to a common storage device 10 in which respective measurement reports which are transmitted to the current base station 1 can be stored.

Figures 2, 3:
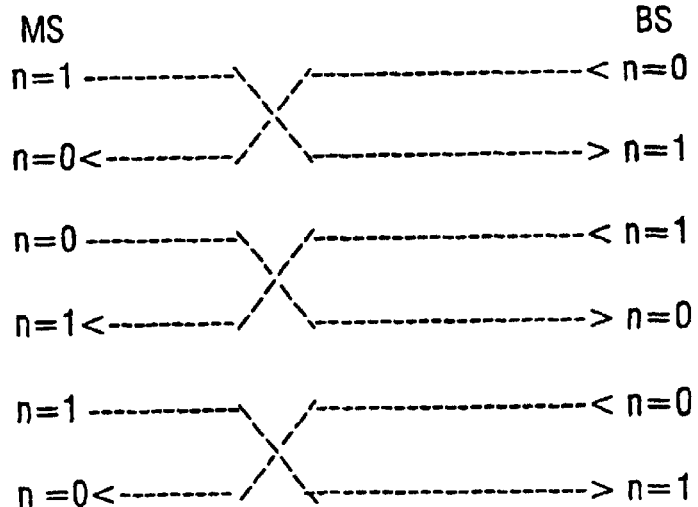
FIG. 2 shows an example of a protocol according to the invention for determining which measurement reports have been received by the current base station.
FIG. 3 shows a diagram for explaining the principle according to the invention with interleaved subchannels.

FIG. 2 illustrates by way of example a protocol for determining which measurement reports have been received by the receiver device 3 of the current base station 1 and have been stored in the storage device 5. The protocol which is explained relates here, for example, to the transmission of measurement reports in the SDCCH (Stand-alone Dedicated Control Channel).

The current base station 1 transmits to the mobile station 2, after the latter has transmitted a measurement report, a first acknowledgment information item in the form of an additional bit Ack from the current base station 1 to the mobile station 2. This bit Ack is set to Ack=0 if the current base station 1 has not correctly received the measurement report transmitted by the mobile station 2, whereas the bit Ack is set to Ack=1 if the current base station 1 has correctly received the measurement report transmitted by the mobile station 2.

The mobile station 2 transmits a second acknowledgment information item (N(S)) to the current base station 1 which indicates whether the mobile station 2 has correctly received the preceding first acknowledgment information item, i.e. the bit Ack. In the event that the mobile station 2 has correctly received the bit Ack from the current base station, the mobile station 3 transmits the second acknowledgment information item in the form of a bit N(S) to the current base station 1.

At the start of a transmission, for example when the mobile station 2 switches on, the mobile station 2 sets the bit N(S)=0 and then stores in the storage device 10 the measurement data of the first measurement report, transmitted to the current base station 1, for the various N(S) separately. The bit N(S) is incremented here in modulus 2 and can thus assume the values 0 and 1. Each measurement report is assigned a value of the bit N(S), in each case a file for measurement reports with the value N(S)=1 and a file for measurement reports with the value N(S)=0 being provided in the storage devices 5 and 10 of the current base station 1 and of the mobile station 2, respectively. Earlier measurement reports are overwritten here in each case by later measurement reports with the same value of the bit N(S).

In FIG. 2, R designates the number of the measurement report which is currently being transmitted, in which case the number is not transmitted but serves here only for referencing. Under the two columns "stored", the numbers R of the measurement reports whose measurement data have been stored by the respective station at the respective N(S) are specified under the two possible values 0 and 1 of N(S). ---X| means errored transmission and -----> means error-free transmission.

Whenever a measurement report is received correctly, the current base station 1 stores the measurement data of the received measurement report for each N(S)=0 or N(S)=1 in the storage device 5 separately and in the next downlink the current base station 1 acknowledges the reception by transmitting the bit Ack with a value 1 to the mobile station 2. In the event of the current base station 1 not having received the measurement report, it transmits the bit Ack with a value 0. If the mobile station 2 receivesthe bit Ack with a value 1, it knows that the previously transmitted measurement report has been received by the base station 1 and stored in the storage device 5. The mobile station 2 then increments the bit N(S) in modulus 2 and transmits and stores the next measurement report under this changed value of N(S). Because both the base station 2 and the current base station 1 then have the same adjacent identity information stored for the previous N(S), this information can be referenced in order to encode the measurement report more efficiently.

In the example shown in FIG. 2, the first measurement report (R=1), which is transmitted from the mobile station 2 to the current base station 2, is not received and stored by the current base station 1 owing to incorrect transmission. For this reason, the current base station 1 transmits a first acknowledgment information item in the form of the bit Ack with the value 0 to the mobile station 2. When the second measurement report (R=2) is transmitted from the mobile station 2 to the current base station 1, the first measurement report (R=1) in the storage device 10 is overwritten because N(S) still retains the value 0. The second measurement report is correctly received by the current base station 1 and stored in the storage device 5 with the value N(S)=0. The current base station 1 then transmits to the base station 2 the bit Ack with the value 1 in order to acknowledge the reception of the second measurement report. During the transmission of the bit Ack from the current base station 1 to the mobile station 2 a transmission error takes place. For this reason, the mobile station 2 does not increment the bit N(S) and overwrites the second measurement report in the storage device 5 with the third measurement report because the value N(S)=0 is also assigned to the latter. The third measurement report (R=3) is also received correctly by the current base station together with the bit N(S)=0 and written into the storage device 10 instead of the second measurement report because the value N(S)=0.

The current base station 1 in turn transmits the bit Ack with a value of 1 to the base station 2. The mobile station 2 receives the bit Ack=1 correctly this time and increments the value of N(S) in modulus 2, i.e. the value of N(S) becomes 1. The result of this is that the fourth measurement report is stored under the value N(S)=1 in the storage device 10. Because [lacuna] took place both to the mobile station 2 and to the current base station 1 after the transmission of the third measurement report (R=3) and the satisfactory transmission of the following acknowledgment bit Ack with the value 1 to the mobile station 2, the third measurement report could be used as a reference measurement report starting from this time. For this reason, in the fourth measurement report the mobile station 2 can refer to the third measurement report because it can be sure that the third measurement report had been satisfactorily received and stored in the current base station. When storing the transmission of the fourth measurement report (R=4) to the current base station 1 a transmission error occurs. The current base station 1 then transmits the bit Ack with a value of 0 to the mobile station 2. In the process, the bit N(S) retains the value 1. The fifth measurement report (R=5) is written into the storage device 10 instead of the fourth measurement report under N(S)=1, and is transmitted to the current base station 1. Reference can also be made to the third measurement report in the fifth measurement report in order, in accordance with the present invention, to avoid transmitting once more measurement data which have already been transmitted. This time, the current base station 1 receives the measurement report satisfactorily and stores it under the value N(S)=1 in the storage device 5. Because the current base station receives the fifth measurement report satisfactorily and stores it under the value N(S)=1 in the storage device 5, the bit Ack with the value 1 is transmitted to the mobile station 2. The bit N(S) is then incremented in the mobile station 2 in modulus 2, i.e. set to 0. The sixth measurement report (R=6) is then written into the storage device 10 instead of the third measurement report under N(S)=0 and is transmitted to the current base station 1. Because the mobile station 2 is aware at this time that the fifth measurement report is stored under the value N(S)=0 in the storage device 5 of the current base station 1, in the sixth measurement report reference can thus be made to measurement data which have already been transmitted in the fifth measurement report.

The protocol which is explained by way of example in FIG. 2 ensures that for each measurement report which is transmitted both parties, i.e. the mobile station 2 and the current base station 1, have stored the same measurement report transmitted earlier, at the previous value of N(S). There is an exception in the connection setup because neither the current base station 1 nor the mobile station 2 have anything stored here. This information item can be specified in the transmitted measurement reports as known. This protocol which is being described has similarities with the layer-2-protocol which is known per se, but here the transmission of a frame which is firstly transferred to the layer-2 is not ensured but instead both parties know which frame was the last to be transmitted correctly with the last N(S) to be used.

Next, a protocol for determining which measurement reports have been received by the current base station 1 and stored will be explained by way of example with reference to FIG. 3 for the case of TCCH (Traffic Control Channel). In some channels, as in TCCH for example, the information is not transmitted alternately but rather in overlapping fashion, i.e. after the transmission of a time frame, the next thing which the mobile station receives is not the response to this time frame but rather to an earlier time frame. The response which is expected occurs only at point k, k>1, i.e. the time frames cross over on the transmission path, which is also referred to as round trip delay. In the GSM system, this is the case for the SACCH (Slow Associated Control Channel) in TCCHs, and k=2 here. Nevertheless, the method which is explained with reference to FIG. 2 can be used, but k channels are defined which are numbered from 0 to k−1 and work independently of one another. FIG. 3 illustrates an example of k=2, the subchannel n=0 being indicatedin the usual way and the subchannel n=1 being indicated in bold. The principle which is shown in FIG. 3 can also be applied to k subchannels.

The optimized possibility according to the invention for coding measurement reports is explained below by way of example for the case of SDCCH. The first measurement report (R=1) is encoded in the conventional way. As soon as the mobile station 2 knows that the current base station 1 has received a measurement report with R=1 and stored it in the storage device 5, and the mobile station 2 has also stored the parameters of this measurement report in the storage device 10, the encoding according to the invention is applied. For measurements of adjacent base stations which relate to adjacent base stations which have already transmitted in one of the preceding measurement reports, the measurement data characterizing the adjacent base station (frequency, BSIC) do not need to be repeated; a reference to the corresponding earlier measurement report is sufficient. For example, in this context, reference data which relate to the position at which the measurement data of this adjacent base station have been transmitted within the earlier measurement report are sufficient. This information can also be encoded within the scope of the reference information with a much smaller number of bits. For example, it is possible to insert at the start of the measurement report a bitmap which indicates which adjacent base stations of the earlier measurement report are repeated, directly followed by the field strength measurements for these repeated base stations. Then, in the conventional format, this is followed by new adjacent base stations which have not yet been mentioned in the earlier measurement report. The same principle is applied in the next measurement report.

For the measurement reports, it is therefore necessary to transmit all the measurement data only at the beginning, repeated measurements can be encoded much more efficiently. The transmission capacity which becomes free as a result can either be saved or used in some other way or additional measurement data referring to other adjacent base stations can be transmitted.

FIG. 4 shows, in a table, examples of the structure of measurement reports according to the invention within the scope of the GSM system. The normally known structure for six adjacent base stations comprises 6×(11+6)+3=105 bits. Within the scope of the present invention, it would be possible, for example, to use the following code as the code for the second measurement report: 6 bits–bitmap+6×6 bits field strength=42 bits in order to encode the same information. In order to utilize the 105 bits, the number of new adjacent base stations can additionally be encoded in two bits, and three new adjacent base stations can be encoded in 3×17 bits.

A general example for the encoding method according to the invention comprises a 12-bit bitmap for up to 12 repeated adjacent base stations, a maximum of 12×6 field strength measurement (depending on the number of repetitions), three bits for encoding the number of new adjacent base stations and at least 1×(11+6) bits for the channel identifier and the field strength measurement, depending on the free capacity. The total is then 12+12×6+3+1×(11+6)=105 bits.

In this way, the method according to the invention can be used to encode up to seven additional adjacent base stations with the same number of bits (105), in which case the additional bit for N(S) also has to be taken into account. With up to two repeated adjacent base stations there is still no substantial improvement, but after this more and more additional adjacent base stations up to a maximum of 13 can be encoded. Alternatively, the number of bits required can be reduced; this is appropriate if it enables other information to be encoded or transmission bandwidth to be saved. The encoding can be optimized further if, for example, the number of new adjacent base stations is not always encoded with three bits but rather with as many bits as are necessary. Furthermore, it is possible to provide for the repeated adjacent base stations to be able to be selected not only from the adjacent base stations of the last measurement report but also from the ones transmitted before it, the adjacent base stations which have no longer been mentioned for the longest time dropping out of the list. This is advantageous in particular if individual adjacent base stations drop in and out repeatedly at the end of the list of the stored measurement reports.

The present invention can also easily be applied in channels in which the information is transmitted in overlapping fashion, for example in TCCH, by virtue of the fact that the principle of the present invention is practiced independently for all subchannels. A further improvement can occur here by virtue of the fact that if a better measurement report is transmitted on a subchannel, i.e. a measurement report is more similar to the currently transmitted measurement report, in which therefore more adjacent base stations can easily be referenced, and if the mobile station 2 knows that the current base station 1 has received and stored this measurement report, this measurement report can also be referenced. However, the subchannel k must then also be encoded in the transmitted measurement report, for which purpose, in the case of the GSM system, a bit is necessary, as well as in addition the bit N(S) which is valid there. Because the current base station 1 only knows which acknowledgment the mobile station 2 has already received when the mobile station 2 transmits with a new N(S), the current base station 1 could otherwise not receive this new measurement report. In the GSM system, it is then necessary to use two bits in addition.

What is claimed is:

1. A method for transmitting data packets between a mobile station and a current base station of a mobile radio system, the method comprising the steps of:

repeatedly transmitting a plurality of measurement reports from the mobile station to the current base station, each of the plurality of measurement reports containing measurement data relating to a number of adjacent base stations; and storing each of the plurality of measurement reports in at least one of the mobile station and current base station;

wherein a later measurement report contains reference information for at least one adjacent base station whose measurement data has already been received by the current base station in an earlier measurement report and stored by the current base station, the reference information referring to an identification of the measurement data of the respective earlier measurement report.

2. The method for transmitting data packets as claimed in claim 1, wherein earlier measurement reports are stored in the mobile station and the current base station in such a way that the same earlier measurement reports to which reference is made in a later measurement report are respectively stored in both the mobile station and the current base station.

3. The method for transmitting data packets as claimed in claim 1, further comprising: the step of transmitting a first acknowledgment information item from the current base station to the mobile station after the mobile station has transmitted a measurement report in order to acknowledge whether the current base station has received the measurement report.

4. The method for transmitting data packets as claimed in claim 3, wherein the mobile station transmits to the current base station a second acknowledgment information item acknowledging whether it has received the preceding first acknowledgement information item for each measurement report.

5. A method for transmitting data packets as claimed in claim 1, wherein the measurement data of the respective earlier measurement report is not contained in the later measurement report, with the reference information identifying the measurement data of the respective earlier measurement report instead.

6. An apparatus for transmitting data packets between a mobile station and a current base station of a mobile radio system, comprising:

a mobile station having a first transmitter device; and a current base station having a first receiver device and a first storage device;

wherein the first transmitter device in the mobile station is configured to repeatedly transmit measurement reports to the first receiver device in the current base station, each measurement report containing measurement data relating to a number of adjacent base stations being provided in the mobile station; and a later measurement report contains reference information for at least one adjacent base station whose measurement data have already been received by the first receiver device of the current base station in an earlier measurement report and stored in the first storage device of the current base station, the reference information referring to an identification of the measurement data of the respective earlier measurement report.

7. The apparatus for transmitting data packets as claimed in claim 6, wherein the mobile station has a second storage device, and the first and second storage devices of the current base station and the mobile station, respectively, are configured to store earlier measurement reports, in each case the same earlier measurement reports to which reference is made in a later measurement report being stored in both first and second storage devices.

8. The apparatus for transmitting data packets as claimed in claim 6, further comprising:

a second transmitter device in the current base station and a second receiver device in the mobile station, the second transmitter device configured to transmit a first acknowledgment information item to the second receiver device of the mobile station after a measurement report has been transmitted by the first transmitter device that serves to acknowledge whether the first receiver device of the current base station has received the measurement report.

9. The apparatus for transmitting data packets as claimed in claim 8, wherein the first transmitter device of the mobile station transmits to the first receiver device of the current base station a second acknowledgment information item acknowledging whether the second receiver device of the mobile station has received a preceding first acknowledgment information item for each measurement report.

10. An apparatus for transmitting data packets as claimed in claim 6, wherein the measurement data of the respective earlier measurement report is not contained in the later measurement report, with the reference information identifying the measurement data of the respective earlier measurement report instead.

* * * * *